April 7, 1959   J. J. ROBINSON, JR   2,880,481
WALLBOARD FASTENING MEANS
Filed Nov. 5, 1953

INVENTOR
JOSEPH J. ROBINSON, JR.
BY
ATTORNEY

United States Patent Office 2,880,481
Patented Apr. 7, 1959

2,880,481

WALLBOARD FASTENING MEANS

Joseph J. Robinson, Jr., Dover, Ohio, assignor to Marsh Wall Products, Inc., Dover, Ohio, a corporation of Ohio Application November 5, 1953, Serial No. 390,298

8 Claims. (Cl. 20—92)

The present invention relates to a fastening means for wallboard articles. More particularly, it relates to a fastener for securing wallboard panels, tile, or the like to a supporting wall structure such as furring strips, sheathing, or the like structures.

A primary object of the invention is the provision of a fastener designed particularly for securing wallboard articles and shaped to fit into tongue and groove joints between two wallboard panels or the like articles.

Another object of the invention resides in the provision of a fastener which, when applied, is not visible when the fastener is in position securing the wallboard articles in place.

A further object is the provision of a strong, light fastener which may be economically produced and easily used in applying wallboard to wall supporting structures.

Figure 1:
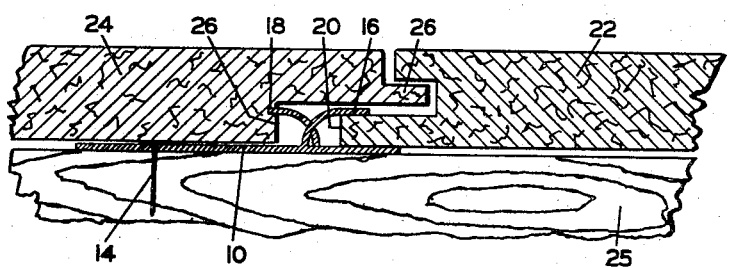
Figure 2:
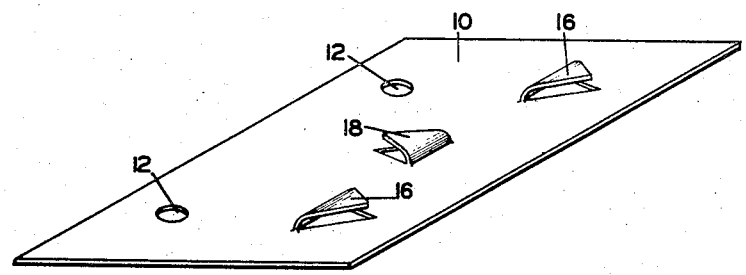
Figure 3:
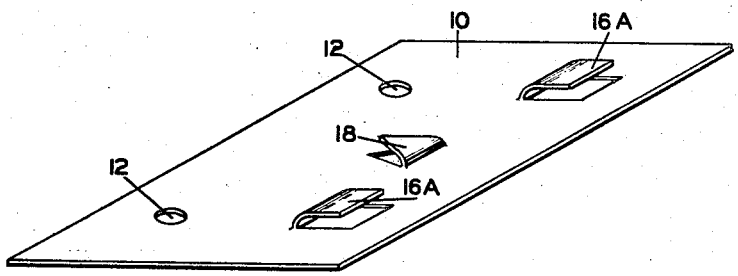

Other objects will be apparent from the following description of the invention with relation to the accompanying drawings wherein:

Fig. 1 is an enlarged, fragmentary, horizontal sectional view of the fastener as applied in a tongue and groove joint, Fig. 2 is a perspective view of one form of the fastener, and Fig. 3 is a perspective view of another embodiment of the fastener.

Referring to the drawings, the numeral 10 designates the flat base portion of the fastener which is provided with the nail holes 12 to receive the nails 14. The base portion is preferably flat in order to fit snugly against furring strips, sheathing and the like structures. The base portion of the fastener, which is preferably of metal construction, is retracted to form the spaced-apart prongs 16. The prongs 16 extend upwardly from the base 10 and are bent to project clamp portions lying in a plane substantially parallel to the plane of the base 10. The end portions of the prongs 16 are substantially parallel to the edge of the base 10 toward which the prongs are directed. The single prong 18 is retracted from the base portion 10 and extends in the direction opposite to that of the spaced-apart prongs 16. The prong 18 is bent to project a tang portion lying in a plane substantially parallel to the plane of the base 10. The base lines of the prong members are immediately adjacent and parallel to a common line extending between them. Additionally, due to the direction of retraction of the prongs, these members overlap the common line above referred to.

In use, the prongs 16 engage the extended edge 20 of the female portion of a wallboard 22 cut in tongue and groove manner as illustrated in Fig. 1. A portion of the wallboard 22 overlies the base 10. The fastener is attached to the underlying furring strip or sheathing 25 by the nails 14. This operation secures the wallboard 22 thereto. Another wallboard 24 is placed in position for securing with the tongue portion 26 thereof positioned in the groove provided in the already secured wallboard 22. The undercut edge portion 26 butts against the tang of prong 18. Only slight pressure is required, sufficient to slightly pierce the edge 26 of the wallboard 24. This provides a uniform spacing between panels and eliminates the necessity for measuring. It is preferable that a space for expansion of about 1/32 inch or more be left between adjacent wallboards and the fastening means automatically provides this spacing. Subsequent to the application of the wallboards, changes in the surrounding atmosphere may cause expansion of the boards and the space left therebetween is in the nature of an expansion joint. During expansion of the boards, the tang portion of the prong 18 pierces the edge 26 which butts thereagainst thus allowing the panel to move without buckling of the wallboard.

The spaced-apart prongs 16 overlie the extended edge portion 20 of the wallboard 22, thus clamping the joint securely against the wall structure. In Fig. 3, a modification of the fastener is shown wherein the prongs 16a are designed with straight leading edges rather than the tang shaped prongs 16 of Fig. 2. Obviously, other modifications may also be employed, the shape of the spaced-apart prongs 16 being of no consequence other than to provide clamping means whereby the female portion of a tongue and groove wallboard may be secured to a wall structure. The prong 18, however, must necessarily comprise a tang adapted to pierce an abutting wallboard edge portion during expansion thereof. The novel fastener of the invention is particularly adapted to be used for the application of relatively thin hardboard panels to a wall structure. Ordinarily, panels and/or tile manufactured from hardboard are characterized by thicknesses of the order of magnitude of about 3/16 inch to about 5/16 inch or slightly greater. The novel fastener provides a means for the application of such hardboards which represents a decided advantage over the heretofore employed methods which usually comprised gluing or cementing the wallboard panels or tile to wall sheathing. The fastener provides a cheap and economical means which is easily applied and which greatly reduces the cost of the labor involved in applying hardboard panels and tile to wall structures.

As many apparently widely different embodiments of this invention may be made without departing from the spirit and scope thereof, it is to be understood that the invention is not to be limited to the specific embodiments thereof except as defined in the appended claims.

I claim:

1. A wallboard fastener for attaching tongue and groove-cut sheets comprising a substantially flat base, a pair of spaced-apart prongs retracted from and formed integrally with the base, said prongs extending from the base in upturned end portions and bent to project clamp portions lying in a plane substantially parallel to the plane of the base, said clamps constituting means to grip a portion of the adjacent edge of a wallboard overlying said base, and a prong retracted from and formed integrally with the base and extending in a direction opposite to that of said spaced-apart prongs, said prong extending from the base in an upturned end portion and bent to project a pointed tang portion lying in a plane substantially parallel to the plane of the base, said tang constituting means to abut an adjacent edge portion of another wallboard overlying said base as a spacer therefor and to penetrate thereinto during expansion of the board, and said prong members overlapping a common line extending between their bases.

2. A wallboard fastener comprising a substantially flat base, a pair of spaced-apart prongs retracted from and formed integrally with the base, said prongs extending from the base in an upturned end portion and bent to project clamp portions lying in a plane substantially parallel to the plane of the base and said end portions being in alignment and substantially parallel to the edge of the base toward which the prongs extend, said clamps constituting means to grip a portion of the adjacent edge of a wallboard overlying said base, and a prong retracted from and formed integrally with the base and extending in the direction opposite to that of said spaced-apart prongs, said prong extending from the base in an upturned end portion and bent to project a pointed tang portion lying in a plane substantially parallel to the plane of the base, said tang constituting means to abut an adjacent edge portion of another wallboard overlying said base as a spacer therefor and to penetrate thereinto during expansion of the board, and said prong members overlapping a common line extending between their bases.

3. A wallboard fastener comprising a substantially flat base, a pair of spaced-apart prongs retracted from and formed integrally with the base, said prongs comprising upturned end portions extending from the base and bent to throw out clamp portions, said end portions being aligned and substantially parallel to the edge of the base toward which the clamp portions extend, and a single prong retracted from and formed integrally with the base and extending in the direction opposite to that of said spaced-apart prongs, said single prong extending from the base in an upturned end portion positioned intermediate between said spaced-apart prongs and offset from alignment therewith, said prong being bent to project a pointed tang portion constituting means to abut an adjacent edge portion of a wallboard overlying said base and to penetrate thereinto during expansion of the board, and said prong members overlapping a common line extending between their bases.

4. A wallboard fastener comprising a substantially flat base, a pair of spaced-apart prongs retracted from and formed integrally with the base, said prongs extending from the base in upturned end portions in alignment with each other and substantially parallel to the edge of the base toward which said prongs extend, said prongs bent to project clamp portions lying in a plane substantially parallel to the plane of the base and constituting means to grip a portion of the adjacent edge of a wallboard overlying said base, and a single prong retracted from and formed integrally with the base and extending in the direction opposite to that of said spaced-apart prongs, said single prong extending from the base in an upturned end portion positioned intermediate between said spaced-apart prongs and offset from alignment therewith, said single prong bent to project a pointed tang portion lying in a plane substantially parallel to the plane of the base, said tang constituting means to abut an adjacent edge portion of another wallboard overlying said base and to penetrate thereinto during expansion of the board, and said prong members overlapping a common line extending between their bases.

5. In a building structure which comprises a supporting wall member together with a plurality of tongue and groove wallboard sheets attached thereto, the combination which comprises a wallboard fastener rigidly attached to said supporting wall member, said fastener containing a pair of spaced-apart prongs retracted from and formed integrally with the base of said fastener, said prongs comprising means which overlie and grip the adjacent edge of an overlying wallboard, a prong retracted from the base of said fastener and extending in the direction opposite to that of said spaced-apart prongs, said prong bent to project a pointed tang portion which abuts an adjacent edge portion of another overlying wallboard, and said wallboards being placed in joining tongue and groove position overlying said fastener whereby said wallboards are attached to said supporting wall member.

6. In a building structure which comprises a supporting wall member together with a plurality of tongue and groove wallboard sheets attached thereto, the combination which comprises a wallboard fastener rigidly attached to said supporting wall member, said fastener containing a pair of spaced-apart prongs retracted from and formed integrally with the base of said fastener, said prongs comprising means which overlie and grip the adjacent edge of an overlying wallboard, a prong retracted from the base of said fastener and extending in the direction opposite to that of said spaced-apart prongs, said prong bent to project a pointed tang portion which abuts an adjacent edge portion of another overlying wallboard, said prong members overlapping a common line extending between their bases, and said wallboards being placed in joining tongue and groove position overlying said fastener whereby said wallboards are attached to said supporting wall member.

7. In a building structure which comprises a supporting wall member together with a plurality of tongue and groove wallboard sheets attached thereto, the combination which comprises a wallboard fastener rigidly attached to said supporting wall member, said fastener containing a pair of spaced-apart prongs retracted from and formed integrally with the base of said fastener, said prongs extending from the base in upturned end portions and bent to project clamp portions lying in a plane substantially parallel to the plane of the base, said clamp portions overlying and gripping the adjacent edge of an overlying wallboard, a prong retracted from the base of said fastener and extending in the direction opposite to that of said spaced-apart prongs, said prong extending from the base in an upturned end portion and bent to project a pointed tang portion lying in a plane substantially parallel to the plane of the base and abutting an adjacent edge portion of another overlying wallboard, and said wallboards being placed in joining tongue and groove position overlying said fastener whereby said wallboards are attached to said supporting wall member.

8. In a building structure which comprises a supporting wall member together with a plurality of tongue and groove wallboard sheets attached thereto, the combination which comprises a walboard fastener rigidly attached to said supporting wall member, said fastener containing a pair of spaced-apart prongs retracted from and formed integrally with the base of said fastener, said prongs extending from the base in upturned end portions in alignment with each other and bent to project clamp portions lying in a plane substantially parallel to the plane of the base, said clamp portions overlying and gripping the adjacent edge of an overlying wallboard, a single prong retracted from and formed integrally with the base of said fastener and extending in the direction opposite to that of said spaced-apart prongs, said single prong extending from the base in an upturned end portion positioned intermediate between said spaced-apart prongs and offset from alignment therewith, said single prong bent to project a pointed tang portion lying in a plane substantially parallel to the plane of the base, said tang abutting an adjacent edge portion of another overlying wallboard, and said wallboards being placed in joining tongue and groove position overlying said fastener whereby said wallboards are attached to said supporting wall member.

References Cited in the file of this patent

UNITED STATES PATENTS

| | | |
|---|---|---|
| 876,399 | Robinson | Jan. 14, 1908 |
| 1,898,364 | Gynn | Feb. 21, 1933 |
| 2,116,737 | Urbain | May 10, 1938 |
| 2,282,631 | Winship | May 12, 1942 |
| 2,303,103 | Adams | Nov. 24, 1942 |
| 2,339,841 | Deuchler et al. | Jan. 25, 1944 |